(No Model.)
F. BURNS.
FRUIT BASKET COVER FASTENING.
No. 401,002. Patented Apr. 9, 1889.
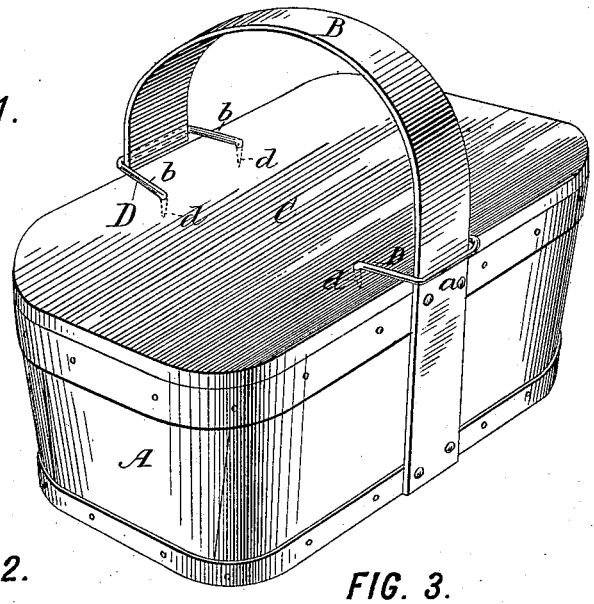
FIG. 1.
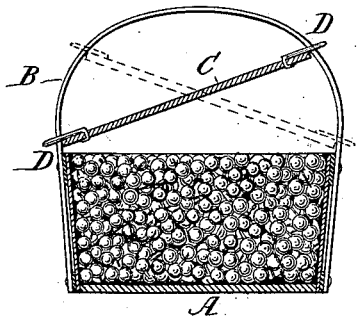
FIG. 2.
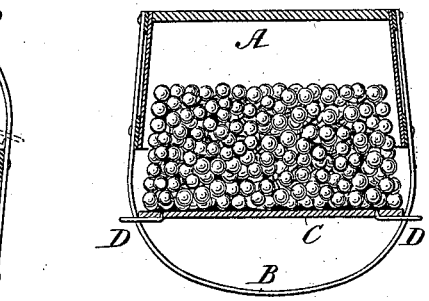
FIG. 3.
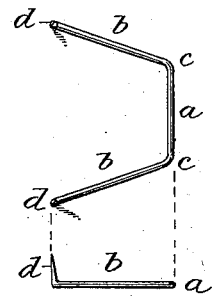
FIG. 4.
FIG. 5.
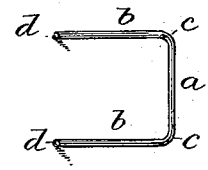
FIG. 6.
FIG. 7.
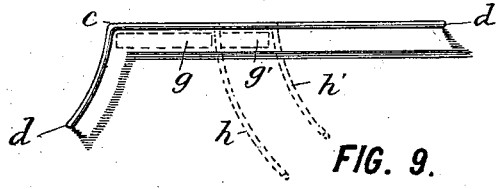
FIG. 8.
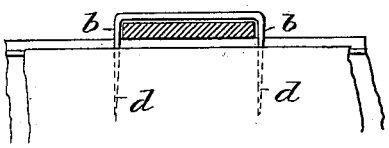
FIG. 9.
WITNESSES:
John A. Renwick
J. A. Criswell
INVENTOR
Frank Burns
By his Attorneys,
Arthur C. Fraser & Co.

UNITED STATES PATENT OFFICE.

FRANK BURNS, OF WESTFIELD, NEW YORK, ASSIGNOR OF ONE-HALF TO ELIJAH W. HOLT, OF SAME PLACE.

FRUIT-BASKET-COVER FASTENING.

SPECIFICATION forming part of Letters Patent No. 401,002, dated April 9, 1889.

Application filed January 22, 1889. Serial No. 297,170. (No model.)

*To all whom it may concern:*

Be it known that I, FRANK BURNS, a citizen of the United States, residing at Westfield, Chautauqua county, State of New York, have invented certain new and useful Improvements in Fruit-Basket-Cover Fastenings, of which the following is a specification.

This invention relates to the fastenings for the covers of baskets for containing fruit and other things, being especially applicable to baskets of the kind having a handle or bail extending in a curve or arch over the top of the basket.

The invention provides a covered fruit-basket with a simple, cheap, and easily-applied fastening, which has the advantage of enabling the cover to be lifted in order to permit the contents of the basket to be examined, while when the cover is down in place it prevents its displacement in either lateral or longitudinal direction and prevents the sides of the basket from being bulged outwardly.

Figure 1 of the accompanying drawings is a perspective view of a grape-basket to which my invention has been applied. Figs. 2 and 3 are transverse sections illustrating how by the employment of my invention the contents of the basket may be examined without removing the cover. Figs. 4 to 8 show different forms of staples and different stages of their manufacture. Fig. 9 is a fragmentary plan of one side of the basket and cover, showing the handle in section and illustrating a modification.

The basket A (shown in Figs. 1, 2, and 3) is made of any material commonly used or suitable for use in the manufacture of baskets, and has a handle, B, the ends of which are fastened to the sides of the basket, and the middle portion of which is arched over the top of the basket in the ordinary manner. The cover C is simply a flat board, the outline of which approximately coincides with the top of the basket, so that when the cover is applied it rests upon the top thereof. Baskets of this kind are most commonly used for putting up grapes for the market, although useful also for many other purposes. It has heretofore been customary to fasten the cover C down to the basket A either by nailing it or tacking it down, or by tying it, or by the employment of wire fastening-hooks engaging the top part of the basket, and having their ends bent over upon the cover and driven down thereinto. Such fastenings are objectionable, because they prevent the contents of the basket from being inspected by the purchaser.

According to my invention I provide staples D, of wire, bent preferably to the form shown in Fig. 4, each staple having a middle portion, $a$, and two side portions, $b\ b$, joining the middle portion by an abrupt bend, $c$, at preferably nearly a right angle, and sharpened end portions or spurs, $d\ d$, which are turned down at right angles, or approximately so, to the plane of the portions $a\ b\ b$. The length of the middle portion, $a$, should be equal to the width of the handle B of the basket with which the fasteners are to be used.

The basket having been filled and the cover C placed in the proper position thereon, one of the fasteners D is placed around the handle B on one side, and with its sharpened ends resting on the top of the cover. These ends are then driven down into the cover, thereby securely fastening the staple thereto, with its side portions, $b\ b$, lying flat thereupon. The staple on the other side is applied in the same manner. When both are applied as shown in Fig. 1, the cover is fastened securely in place against displacement in longitudinal or lateral direction, and the cover and staples serve as a tie, extending transversely of the basket, and holding the two sides of the handle, and consequently the two sides of the basket, from spreading apart or bulging outwardly. A customer desiring to examine the contained fruit may lift one side of the cover, as shown in full lines in Fig. 2, or he may lift the other side of the cover, as shown in dotted lines therein; or he may turn the basket upside down, holding the cover on one hand, and with the other hand may lift the basket, leaving the contents thereof resting on the cover, whereby both sides of the contained fruit are rendered visible almost or quite for the full depth thereof, as will be understood from Fig. 3.

The precise shape or angle for the fastenings or staples is not essential. Instead of the side portions, b b, extending angularly away from each other, as shown in Fig. 4, they may be arranged parallel, as shown in Fig. 5, the bends c c being consequently at right angles. It is, however, desirable that the pointed ends or spurs d d shall be somewhat farther apart than the mere width of the handle B, for which reason the former construction is preferred; or in lieu thereof the construction shown in Fig. 6 may be employed, where the bends c c are at right angles, and the side portions, b b, are again bent at e e, in order to carry the spurs d d farther apart.

I contemplate the manufacture of these fastening-staples D D and their sale to shippers of fruit, ready to be applied by them to the baskets. They are to be made of different sizes, in order to accommodate them to handles of different widths; or in some cases they are to be sold in the shapes shown in Fig. 7 or 8.

Fig. 7 shows a staple consisting, merely, of a straight wire, with the ends or spurs d d bent down, the two bends c c being left to be formed by the shipper at the time he applies the staple to the basket, and in order that he may bend the staple always to the width of the handle being used. In such case one end d will be first driven into the cover. The staple will then be bent around the handle until the opposite end d is brought into proper place on the cover, and finally the latter will be driven down into the cover.

In cases where the width of the handles is not uniform it will be preferable to apply the staples in this way; or, better, the construction shown in Fig. 8 may be used instead. In this figure the spurs d d are bent down, and in addition one of the bends c is formed, the other bend being left to be formed by the user. If the handle of the basket to which the fastening is applied is narrow, as shown in dotted lines at g, the staple will be bent close upon it, as shown at h, while if the handle is wider, as indicated at g' in dotted lines, the staple will be bent as shown at h'.

Fig. 9 shows a possible modification of my invention, the staple being formed with the pointed ends or spurs d in line with the side portion, b b, and designed to be driven into the edge of the cover. This form is suitable for thick covers, but requires much more care in driving, and is in several respects inferior to the constructions previously described.

I am well aware that wicker baskets have long been made the covers of which are formed on opposite sides with loops permanently attached thereto and embracing and sliding on the opposite sides of the handle. I make no claim to any such construction, it being necessary to my invention that the fastenings applied to the cover and embracing the handle shall be so constructed as to be capable of attachment after the basket has been filled and the cover set in place thereon. These fastenings are also capable of being removed from the cover by prying up against the side portions, b b, without thereby injuring the cover.

I claim as my invention the following-defined novel features and combinations, substantially as hereinbefore specified, viz:

1. The combination, with a covered fruit-basket having a handle arched over its top, of a cover-fastening consisting of two staples driven into the cover on opposite sides, and each embracing the handle, whereby the cover is held in place on top of the basket, and it may be raised to inspect the contents thereof, and the lateral spreading of the basket is prevented.

2. The combination, with a covered fruit-basket having a handle arched over its top, of a cover-fastening consisting of a staple applied to the top of the cover, with its ends bent down and driven into the cover, and its middle portion bent to embrace the handle.

3. The combination, with a covered fruit-basket having a flat handle arched over its top, of a cover-fastening consisting of two staples driven into the cover on opposite sides thereof, each staple formed with a straight middle portion, a, extending outside of the handle, side portions, b b, extending thence inwardly over the cover and confining the edges of the handle between them, and turned-down sharpened end portions, d d, driven into the cover, whereby the endwise displacement of the cover is prevented.

In witness whereof I have hereunto signed my name in the presence of two subscribing witnesses.

FRANK BURNS.

Witnesses:
E. W. HOLT,
JONAS HARRINGTON.